Feb. 24, 1970     KARL EICKMANN     3,497,162
HYDRAULICALLY CONTROLLED, PROPELLER-DRIVEN
FLUIDBORNE VEHICLE

Filed May 24, 1966     3 Sheets-Sheet 1

INVENTOR
KARL EICKMANN

BY

ATTORNEYS

INVENTOR
KARL EICKMANN

ATTORNEYS

Feb. 24, 1970
KARL EICKMANN
3,497,162
HYDRAULICALLY CONTROLLED, PROPELLER-DRIVEN
FLUIDBORNE VEHICLE
Filed May 24, 1966
3 Sheets-Sheet 3
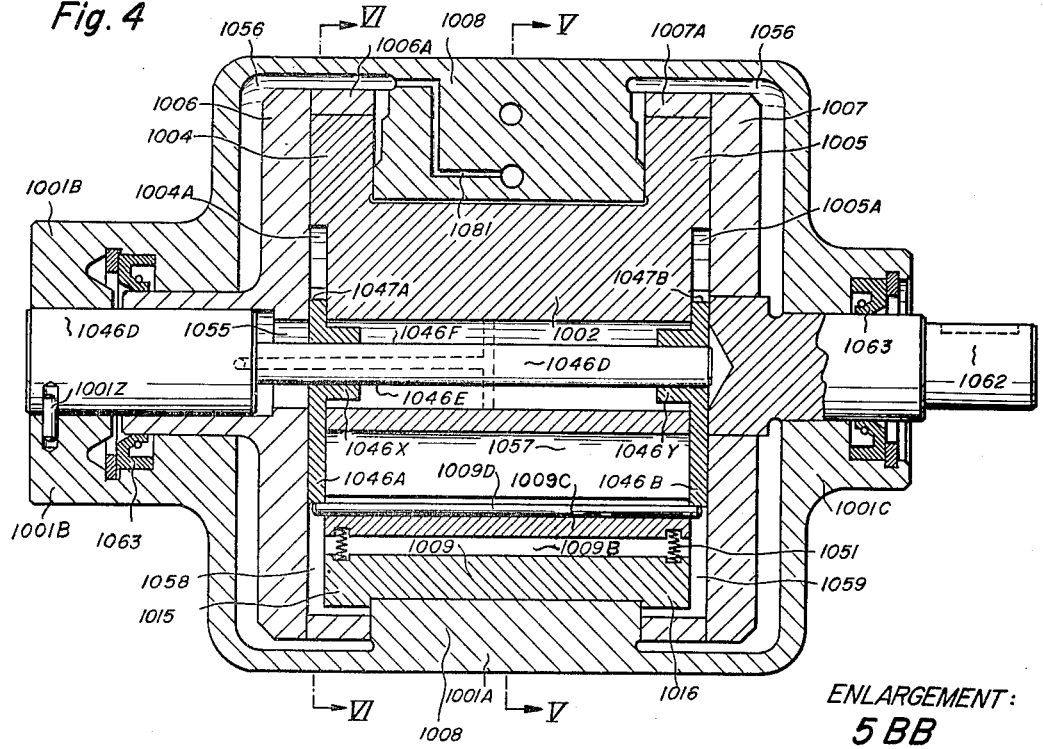
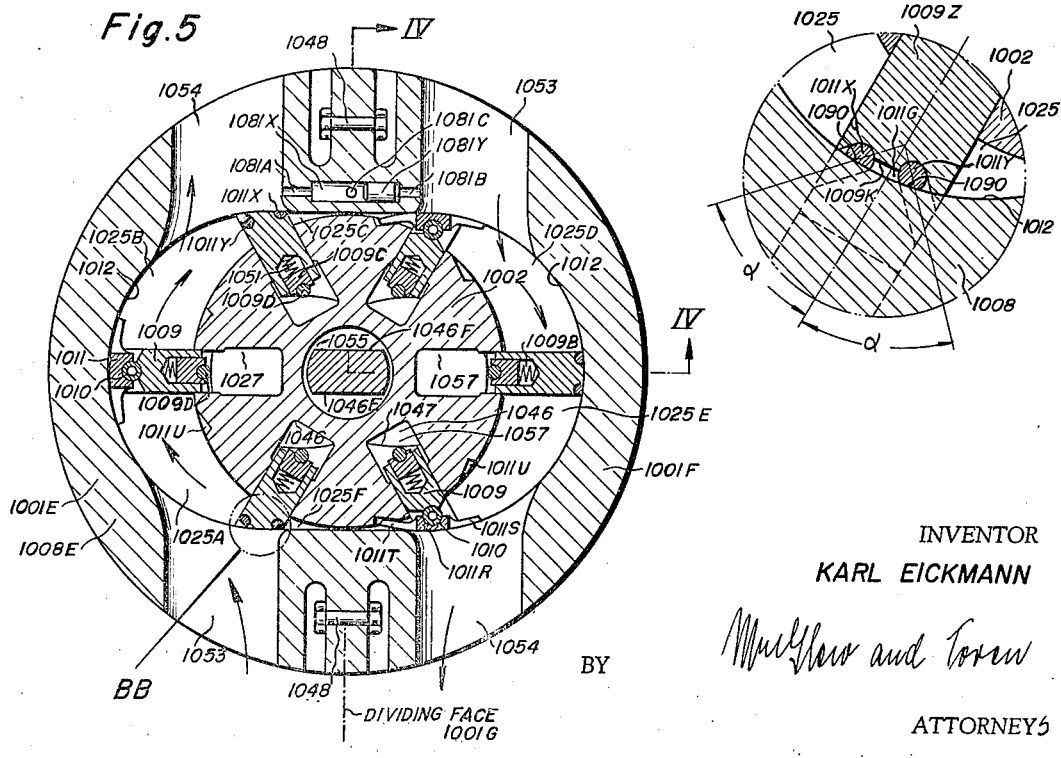
INVENTOR
KARL EICKMANN
ATTORNEYS United States Patent Office 3,497,162
Patented Feb. 24, 1970

3,497,162
HYDRAULICALLY CONTROLLED, PROPELLER-DRIVEN FLUIDBORNE VEHICLE
Karl Eickmann, 2420 Isshiki, Hayama-machi, Kanagawa-ken, Japan
Continuation-in-part of application Ser. No. 328,395, Dec. 5, 1963. This application May 24, 1966, Ser. No. 552,606
Int. Cl. B64d 27/02; B64c 29/00
U.S. Cl. 244—12                                      5 Claims

ABSTRACT OF THE DISCLOSURE

A fluid-stream-borne vehicle, such as an aircraft, has a pair of symmetrically positioned and spaced propellers or the like each of which is driven by a positive displacement type of fluid motor. Both fluid motors are supplied from a common fluid pressure generator which delivers equal or proportionate fluid outputs to each of the two fluid motors. The common fluid generator may have two separate fluid outputs of equal capacity, volume and pressure, one connected to each of the two fluid motors. Alternatively, the common fluid presure generator may have a single output and means may be provided to divide or proportion the output between the two fluid motors.

A feature of the invention is the provision of a fluid pressure generator in the form of a rotary fluid device of the vane-type in which expanding combustion gases acting on the vanes rotate an output shaft which may drive, for example, a third propeller on the aircraft. In addition, each of the vanes is provided with a piston at its inner end operating in a cylinder and, as the vanes reciprocate radially, these pistons draw in and force out fluid. The arrangement is preferably one which involves a four-stroke cycle including drawing in fuel, compressing the fuel, igniting and expanding the compressed fuel and expelling the burned fuel. Preferably, the cycle occurs twice during each 360° rotation of the output or drive shaft.

---

This invention relates to hydraulically operated, propeller-driven fluidborne vehicles, wherein hydraulic currents are utilized for driving hydraulic motors which revolve the rotor or propeller of the vehicle.

CROSS REFERENCES TO RELATED APPLICATIONS

This application is a continuation-in-part of copending application Ser. No. 328,395, filed Dec. 5, 1963, now Patent No. 3,320,898.

BACKGROUND OF THE INVENTION

It is known, to drive propellers of aircraft or helicopters by a hydraulic fluid flow, which splits into several fluid lines for the purpose of driving a plurality of hydraulic motors whereto propellers are connected, so that said hydraulic motors revolve propellers.

However, it was necessary, in such aircraft or helicopters, either to provide hydraulic controllers in the hydraulic circuit for controlling the division of flow for the different propeller motors, or else to adjust the angular velocities of the propeller motors by other control means. This has been necessary because division of the flow of fluid results in communication between the fluid pressure lines leading to the different fluid motors so that, if one propeller was loaded higher than another propeller, for example, a certain quantity of working fluid intended for the higher loaded propeller flowed through the communication into the motor driving the less loaded propeller. Thus, the relative proportioning of the fluid between the two propellers would occasionally be varied so that the propellers would operate at different angular velocities.

Sudden variations in the relative angular velocities of several propellers have resulted in unstable operation of aircraft and helicopters. It was attempted to correct this condition by providing control means, mostly of a manually operable nature, for maintaining predetermined proportionate angular velocities of several propellers.

Such control means required the pilot or driver of the vehicle to pay attention to an additional control element, this partially distracting his attention from other duties. The response of the driver or of a pilot naturally were later than the appearance of the disparity between the angular velocities of different propellers, due to the time elapsing from such appearance until recognition and correction thereof. Thus, even with additional controls, fluid flow operated vehicles of the prior art have been at times, at least temporarily, difficult to control and needing additional control devices, investment and weight, thereby reducing their applicability from the safety, simplicity and stability standpoints.

SUMMARY OF THE INVENTION

The present invention is directed to an improved vehicle operated by plural hydraulic motors and in which the rates of flow of hydraulic fluid to the several motors can be maintained at all times at a predetermined proportion or equal to each other, thus obviating the disadvantages of prior art vehicles of this type. This is effected by providing separate but equal or proportionate hydraulic flows to each of the hydraulic motors, with the flows being maintained entirely separate from each other and not being in communication with each other. Thus, there is no opportunity for an undesired variation between the relative angular velocities of two or more hydraulic motors, irrespective of irregularities in the fluid flow and irrespective of the actions of the driver or of a pilot.

To this end, the invention includes a multi-chamber, multi-flow, fluid flow producing means providing a plurality of hydraulic fluid flows in separated working chambers for the supply of a plurality of completely separate flows whose flow rates are proportional to each other. These flows are delivered to separate and respective delivery lines from the fluid flow producing means to each of the fluid operated motors. Each fluid operated motor drives a respective rotor or propeller. Preferably, the flow rates in the plural delivery lines are maintained equal so that all of the motors drive their respective rotors at the same angular velocity, thereby providing, for example, equal lifting or traction forces from the several rotors.

In another preferred embodiment of the invention, the output of the fluid flow producing means may be varied in such a manner that the flows in all of the delivery lines are simultaneously varied in the same direction and by equal or proportionate amounts. Thereby, it is possible to vary the lifting or traction of the several rotors in equal or proportionate amounts.

The positive displacement fluid motors, or hydraulic motors, are located symmetrically laterally of the vehicle for governing and maintaining a stable attitude of the vehicle utilizing the equal or proportionate angular velocity of the motors. Thus, the fluid motors and the rotors driven thereby may be provided on the wings of a fluid borne vehicle.

As a feature of the invention, the fluid flow producing means may provide both a mechanical output and a pressure fluid output, and the total output may be proportioned between the mechanical output and the pressure fluid output. Such proportion may be varied as desired without affecting the proportionate or equal flows of pressure fluid to the two hydraulic motors.

As a feature of the invention, the control and proportioning of the power outputs can be effected by remote control means, such as by a radar or other control means. Additionally, the vehicle may be made to move both upwardly and downwardly. This makes avoidance of collisions relatively simple.

As an alternative, the fluid flow producing means may have a single output delivered to two separate delivery lines and with check valves provided in each of these lines whereby there can be no back pressure or back flow from one line to another line.

BRIEF DESCRIPTION OF THE DRAWING

For an understanding of the principles of the invention, reference is made to the following description of a typical embodiment thereof as illustrated in the accompanying drawings.

In the drawings:

FIG. 4 is an axial sectional view through a light weight, positive displacement fluid motor embodying the invention, the section being taken along the line IV—IV of FIG. 5;

FIG. 5 is a cross sectional view taken along the line V—V of FIG. 4; and

DESCRIPTION OF THE PREFERRED EMBODIMENT

Figure 1:
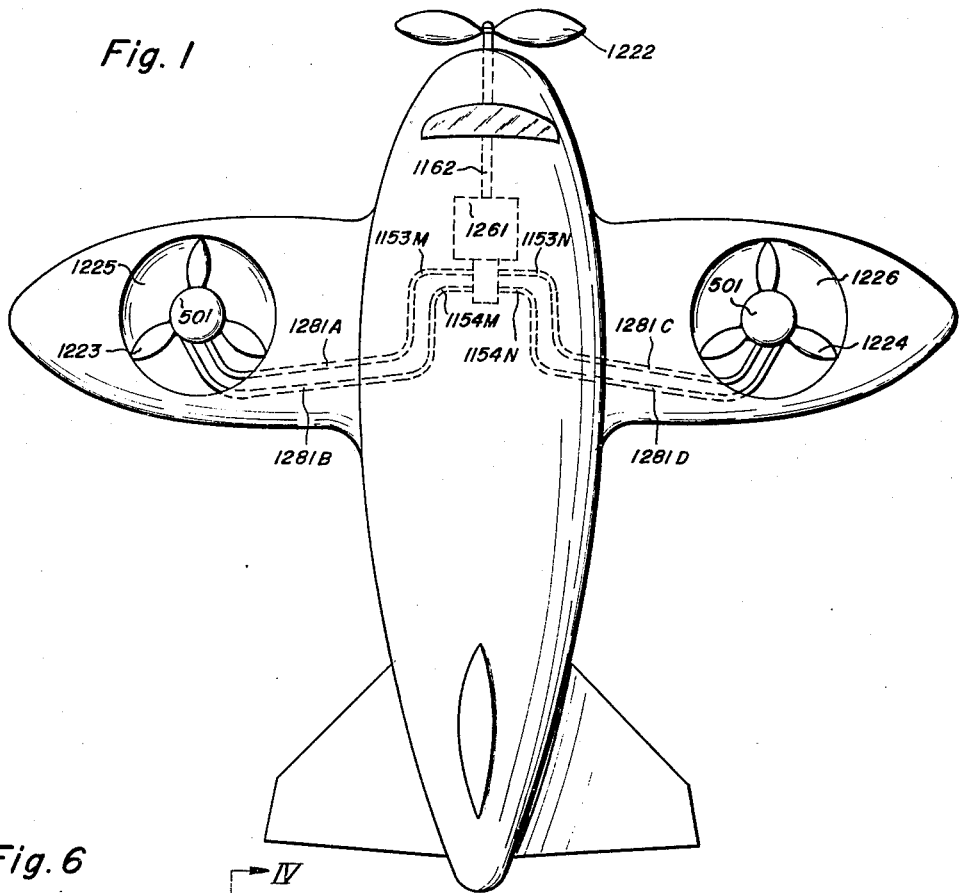
FIG. 1 is a plan view of a fluid borne vehicle embodying the invention.

Referring to FIG. 1, an aircraft is illustrated as having two rotors, 1223 and 1224, located in areas 1225 and 1126, respectively, and each driven by a respective rotary vane-type fluid motor 501. Pressure fluid for operating motors 501, and thus driving rotors 1223 and 1224, is supplied from a fluid flow producing means 1261 which also has a mechanical output shaft 1162 connected to a propeller 1222 on the forward end of the aircraft. It will be noted that rotors 1223 and 1224 are located symmetrically laterally of the aircraft.

A fluid pressure supply line 1281B connects one output port 1154M of fluid flow producing means 1261 to the lefthand motor 501, and a return flow line 1281A connects the lefthand motor 501 to the intake port 1153M of fluid flow producing means 1261. A completely separate system, including supply line 1281D and return line 1281C connects the righthand fluid motor 501 to the output port 1154N and to the input or intake port 1153N of fluid flow producing means 1261. It should be understood that the designation of supply and return lines, as applied to the lines 1281, is arbitrarily choosen, as the motors 501 can be operated in either direction depending upon which one of the lines connected thereto is a supply line and which is the return line, or, alternatively, depending upon the direction of operation of the fluid flow supply means 1261.

Figure 2:
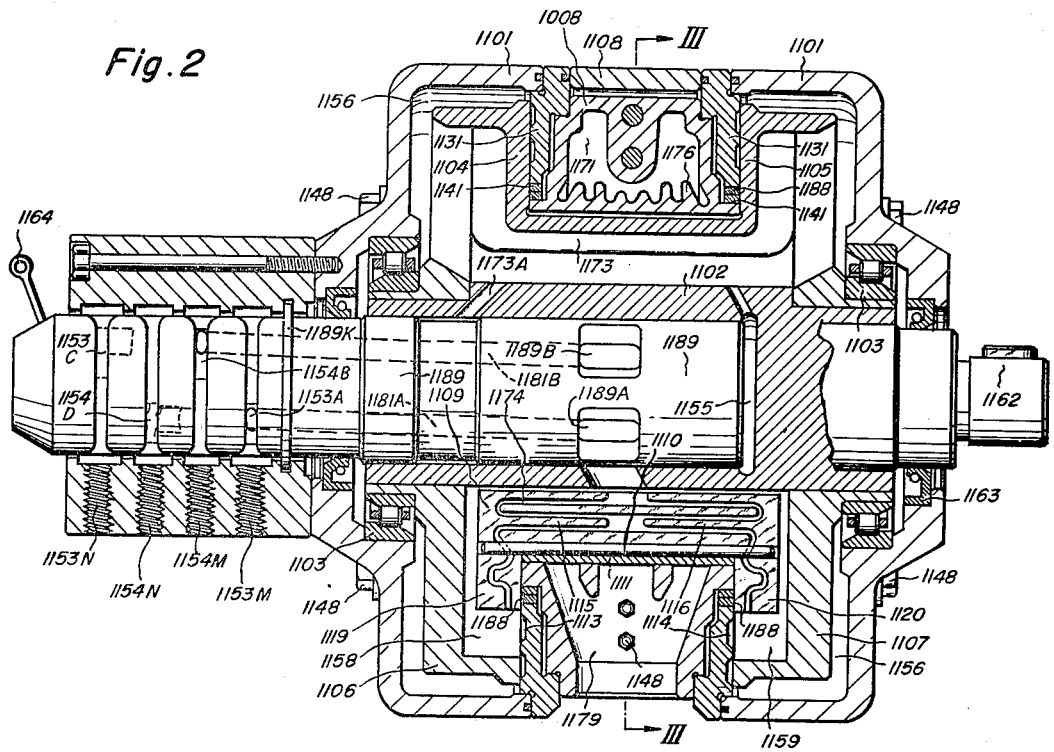
FIG. 2 is an axial sectional view through a rotary fluid producing means providing both a mechanical output and a pressure fluid output and in which two or more pressure fluid outputs are provided which are of proportionate or equal velocity, FIG. 2 representing a section taken along the line II—II of FIG. 3.
Figure 3:
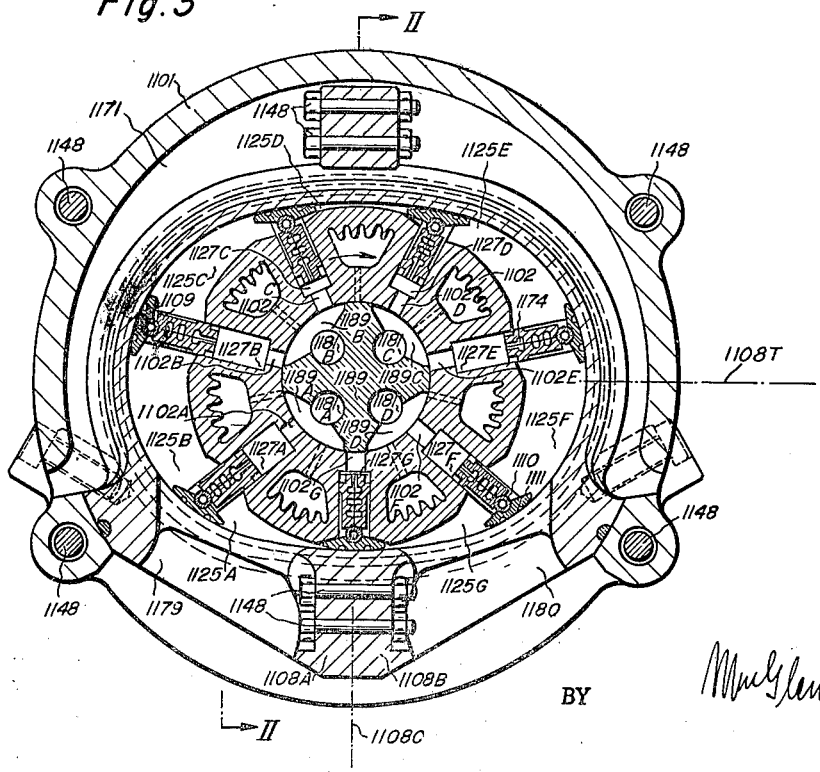
FIG. 3 is a cross sectional view through FIGURE 2 taken along the line III—III.

As will be described hereinafter, the rotary fluid machine 1261 is illustrated in FIGS. 2 and 3, and makes it possible to produce entirely new kinds of drives for machines and vehicles, these drives being applicable to fluid borne vehicles or to drive the propellers of ships, hydrofoils, aircraft, and the like. As will also be described, the rotary fluid machine 1261 includes a control pintle which is adjustable to control the power delivered to the fluid motors 501 and also to proportion the total output power of machine 1261 between the fluid motors 501 and the mechanical output shaft 1162. It is thus possible to drive, by separate flows of pressure fluid, the right side wheels and the left side wheels of a vehicle, and to drive, by means of shaft 1162, heating means, cooling means, air-conditioning means, lubrication means and the like on the vehicle. Furthermore, the arrangement is also operable for driving machine tools, construction machines and the like.

Referring to FIGS. 2 and 3, the output shaft 1162 of machine 1261 is connected, either directly or indirectly, to the propeller 1222. Also, the machine 1261 has output ports 1154B and 1154D into which are threadedly connected conduits 1154M and 1154N, respectively, which are connected to respective conduits 1281B and 1281D in turn connected to the ports of the respective fluid pressure motors 501. Also, the machine has fluid inlet ports 1153A and 1153C into which are threadedly connected conduits 1153M and 1153N, respectively, which are connected to the respective conduits 1281A and 1281C in turn connected to the ports of respective fluid motors 501. The fluid motors 501 may be hydraulic fluid motors such as shown, for example, in FIGS. 4, 5 and 6, and the rotors 1223 and 1224 may be helicopter rotors or the like. In this case, the fluid borne vehicle of FIG. 1 is capable of vertical takeoff and landing as well as horizontal movement through a fluid, such as air.

For example, during vertical takeoff or landing, the control pintle 1189 of FIG. 2 can be moved into the maximum delivery position, shown in FIG. 3, so that practically all of the power produced by the rotary engine 1261 is delivered as pressure fluid to the fluid motors 501, thus driving these motors and their connected rotors at the highest possible and equal or proportionate speeds. Thus, the aircraft will takeoff or land in a very stable condition, because the two propellers 1223 and 1224, operating at the same angular velocity, will keep the entire aircraft in balance and prevent any inclination thereof with respect to the horizon.

After the aircraft has executed a vertical takeoff and is at preselected altitude, the control handle 1164 of the pintle 1189 can be used to angularly displace pintle 1189 into a position decreasing the output of the pressure fluid from the machine 1261. In this case, a percentage of the total power would be applied to shaft 1162 and thus to propeller 1222 to rotate the propeller at a predetermined angular velocity and thus drive the aircraft horizontally while the propellers or rotors 1223 and 1224 are maintaining the vertical position of the aircraft. To effect this control, the pilot need only manipulate the control 1164 of the pintle 1189 in order to move the aircraft horizontally forward or backward or upwardly or downwardly. If control pintle 1189 is an angularly displaced into the zero delivery position, then the entire power of machine 1261 would be delivered to shaft 1162 and thus to propeller 1222 of the aircraft shown in FIG. 1. The aircraft would then move at an increased speed substantially horizontally through the air, while rotors 1223 and 1224 would be at rest. Cover means can then be moved over the respective propeller locations 1225 and 1226 to change the vertical takeoff aperture into a horizontal vane of the aircraft.

On the other hand, if it is desired to decrease the altitude of the aircraft or to go in for a landing, then control pintle 1189 is angularly displaced to the maximum fluid flow quantity delivery position. Under these conditions, no power would be supplied to propeller 1222, and substantially all of the output of machine 1261 would be delivered as a pressure fluid flow to the lifting rotors or propellers 1223 and 1224. The angular velocity of these propellers may be decreased by adjustment of pintle 1189 or by decrease in the angular velocity of engine 1261, so that the aircraft can descend at a slow rate. Clutch means may be provided between shaft 1162 and propeller 1222 in order that this propeller remain stationary.

If an automatic control, such as radar, is provided to prevent collision of the aircraft with other aircraft or with other obstacles, this control would be effective to angularly adjust the pintle 1189. Thus, if an obstruction is in dangerous proximity to the aircraft, pintle 1189 would be angularly displaced automatically into the maximum flow position, thereby interrupting forward movement of the aircraft and either holding the aircraft stationary at a fixed altitude or causing the aircraft to ascend. FIG. 2 illustrates a multi-chamber, multi-flow, fluid flow producing means for providing a plurality of hydraulic fluid flows in completely separate working chambers therein to supply a plurality of separated fluid flows, at proportionate rates of flow, through separated and respective fluid delivery and return passages connected to fluid operated motors. Thus, all of the fluid operated motors are operated at proportionate or equal angular velocities. Preferably, the rate of flow to all of the fluid operated motors is equal and the motors are used to revolve rotors or propellers of equal size and at equal angular velocities.

In accordance with the invention, the chambers in the fluid flow producing means shown in FIG. 2 may be made variable in volume, and the control means may be governed by a fluid flow rate adjusting device to adjust the rate of fluid flow while maintaining the separated fluid flows proportionate or equal to each other so that the angular velocity of the rotors or propellers is variable but at a proportionate or equal rate.

The fluid flow producing means shown in FIGS. 2 and 3 is a combined rotary combustion engine and multi-flow hydraulic fluid pumping device, and is illustrative of a lightweight device useable with the aircraft of FIG. 1. This machine includes a casing element 1108 which is assembled between casing parts 1101. Bearings 1103 in casing parts 1101 rotatably support rotor 1102 and mechanical output shaft 1162. Rotor 1102 includes radially extending sidewalls 1104 and 1105 as well as side covers 1106 and 1107.

Axially elongated radially directed slots 1127 are formed in rotor 1102 in its center part and in its side walls, and these slots have extensions 1158 and 1159. Each slot receives a vane assembly 1109 including a pivot member 1110 pivotally mounting a guide shoe or the like 1111. Vane assemblies 1109 provide the inter-vane spaces of a rotary combustion engine, these spaces being indicated at 1125A through 1125G. Combustion gas inlet ports 1179 deliver a combustible mixture to the inter-vane spaces, and the exhaust gases from the inter-vane spaces are discharged through exhaust ports 1180.

Shaft 1162 may be fixed to the rotary parts or may be integral with the rotor or rotor side walls so as shown in the figure. The rotor may be provided with the rotor center bore or rotor hub 1155.

Casing cooling spaces 1171 may be provided in the casing element 1108, rotor cooling spaces 1173 may be provided in the rotary parts, and heat transfer ribs 1177 or 1176 may extend into the rotor cooling spaces 1173 or casing cooling spaces 1171.

Casing seal members 1141 may be provided in order to seal the clearance between the casing and the side walls, these being already known and called the "rotor wall-casing clearance."

Casing outer seal covers 1131 may also be provided. Bolt means 1148 are provided to secure the casing covers to each other and also to secure the casing halves 1108A and 1108B together at the dividing face or plane 1108C.

During operation of the rotary combustion engine under power, the air-fuel mixture is aspirated through port 1179 into the respective working inter-vane space 1125A and also into the inter-vane space 1125B, in the position shown in FIG. 3. The mitxure is thereafter compressed at the location of inter-vane space 1125C and reaches its maximum compression at the location of inter-vane space 1125D. Thereafter, it may be ignited by ignition means or by the heat due to compression, and thus expand. This expansion takes place initially in the inter-vane space 1125E and the burned mixture is exhausted from inter-vane sapces 1125F and 1125G through exhaust port 1180. This action of the rotary combusion engine, when operating under power, occurs continually, with the air fuel mixture being aspirated into each inter-vane space when the latter is passing the entrance port 1179 and the burned mixture being exhausted from each inter-vane space when the latter is in registry with exhaust ports 1180.

The provision of seven inter-vane spaces and seven vane assemblies as shown in FIGURE 3 is by way of example only. There may be more or less inter-vane spaces or more or less vane assemblies.

Vane cooling spaces or vane cooling means 1174 and/or 1175 may also be provided.

The vanes have axial extensions 1115 and 1116 and radial extensions 1119 and 1120.

Casing seal members 1141 bear against faces 1188 of the axially inner side walls 1104 and 1105. The rotary combustion engine drives shaft 1162, and its power may be taken from shaft 1162 in order to drive, in a mechanical manner, machines or vehicles. However, in addition, interslot spaces 1127 are used for intake of fluid and for pumping of fluid under pressure. The special feature of the machine shown in FIGS. 2 and 3, is that, during each revolution of the rotor, two separate fluid flows will be produced inside the engine.

For the purpose of pumping fluid, the slots 1127 communicate, at their inner ends, with passages 1102A through 1102G. These passages extend into the rotor bore 1155, and are so located that, during each revolution of the rotor, they communicate successively with control ports 1189A through 1189D of control pintle 1189. This pintle is located coaxially in the rotor and can slide or float therein while being in sealing relation therewith.

As mentioned, FIG. 3 illustrates a vertically extending division plane 1108C, and also shows a horizontal division plane 1108T. These two planes divide the machine into four quadrants. The lower left quadrant represents the suction or intake area of the rotary combustion engine, the next or upper left quadrant is the compression area of the internal combustion engine, the upper right quadrant is the combustion volume and the lower right quadrant is the exhaust quadrant. While these quadrants are shown as equal in angular extent, they may, in practice, differ somewhat in angular extent.

When a vane assembly 1109 is rotating through the intake quadrant, the assembly moves radially outwardly and, when the vane assembly is moving through the compression quadrant, it is moved radially inwardly. Similarly, when the vane assembly enters the combustion quadrant, it again moves radially outwardly and, when it enters the exhaust quadrant, it moves radially inwardly. Thus, the spaces 1127A through 1127G are cyclically expanded and contracted twice during each revolution of the rotor. In the position of the parts shown in FIG. 3, the space or volume 1127A is expanding and thus drawing in fluid from pintle space 1189A through passage 1102A. When a vane reaches the position of space 1127B, such intake is stopped and and the volume of space 1127B is decreased to the position 1127C thus forcing fluid through the ports 1102 into the pintle space 1189B. Similarly, when a vane assembly is in the combustion quadrant, such as that the position 1127D, the space 1127D increases in volume to draw in fluid from pintle space 1189C through passage 1102D and this continues until the position 1127E. Thereafter, the space 1127F is decreased in volume forcing fluid through passage 1102 into pintle space 1189D. Thus, the spaces 1127 are cyclically expanded and contracted twice during each revolution.

Control port or space 1189A of pintle 1189 is connected by axial passage 1181A with inlet port 1153A communicating with conduit 1153M. Similarly, pintle control port or passage 1189B is connected by axial 1181B to exhaust port 1154B communicating with conduit 1154M. The same holds true for pintle control port 1189C which is connected by axial passage 1181C to inlet port 1153C connected to conduit 1153N, and pintle control port or passage 1189D is connected through axial passage 1181D to the outlet port 1154D communicating with conduit 1154N.

The two fluid outputs from the passages 1154M and 1154N can either be combined or they can be sent through separate supply lines to fluid operated motors to drive the latter, the return lines from the motors being connected to the respective inlet ports 1153M and 1153N.

In the foregoing discussion, it has been assumed that the rotor is rotating clockwise as shown by the arrow in FIG. 3. However, the rotor could be made to rotate counterclockwise, resulting in reversal of direction of the fluid flows. This could be effected, for example, by supplying a fuel-air mixture to ports 1180 and by exhausting the burned mixture from ports 1179. In this case, the passages 1154M and 1154N would become inlet passages and the passages 1153M and 1153N would become outlet or supply passages. Correspondingly, the direction of rotation of the motors connected to the machine would be reversed. It would also be possible to interconnect pintle control ports 1189B and 1189D, as well as to interconnect control ports 1189A and 1189C.

If control pintle 1189 is rotated about 45° either clockwise or counterclockwise, then each of the control ports 1189A through 1189B would communicate, through about one-half its angular extent, with a zone in which spaces 1127 are decreasing in volume and over the other half of its angular extent with a zone in which the spaces 1127 are increasing in volume. Under these conditions, fluid forced out of the spaces 1127 which are decreasing in volume would simply flow through the communicating control port and into the spaces which are increasing in volume, and there would be no net fluid output or fluid input for the machine. The angular adjustment of the control pintle need not be exactly 45°, but only of the order of 45°, depending on the actual design of the rotary combustion engine and the fluid flow producing device.

With the control pintle adjusted through substantially 45°, as just described, all of the power produced by the machine 1161 would be delivered to the output shaft 1162. This is the zero delivery position of control pintle 1189, and FIG. 3 shows the maximum delivery position of the control pintle in which all of the output of machine 1261 is delivered as a flow of fluid under pressure and there is substantially no mechanical output delivery to shaft 1162.

By controlling the angular position of pintle 1189, it is possible to vary the hydraulic fluid output of the machine between zero and the maximum and correspondingly vary the mechanical output, through shaft 1162, from maximum to zero. Such a change in the output can be done in a stepless manner.

It is also possible to rotate control pintle 1189 through substantially 90°. Under these circumstances, the fluid output ports become fluid inlet ports and the fluid inlet ports become fluid outlet ports. Thus, when pintle 1189 is rotated through substantially 90° from the position shown in FIG. 3, the flow of hydraulic fluid is reversed and consequently the direction of rotation of the fluid motors connected to the outlet and inlet passages 1153 and 1154 is reversed.

It is therefore possible, with the machine shown in FIGS. 2 and 3, to provide two separate fluid flows and to vary the quantities of these flows between zero and the maximum while maintaining proportion or equality between the two flows.

Figure 6:
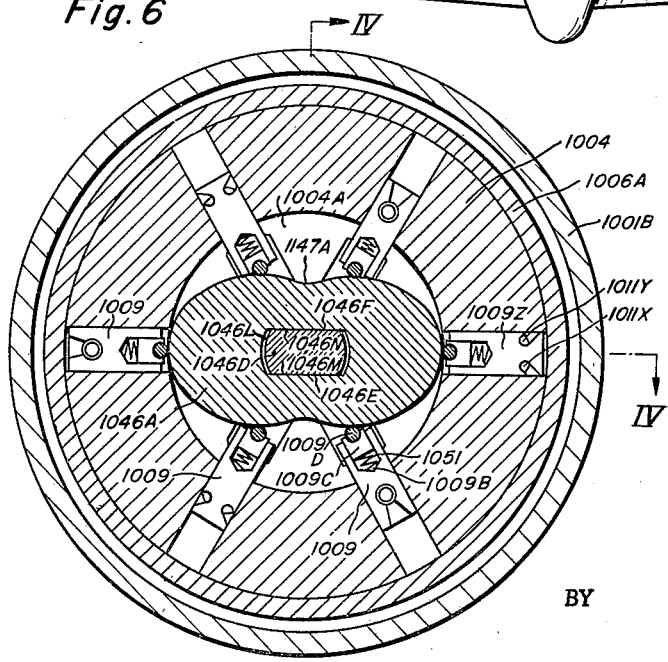
FIG. 6 is a cross sectional view taken along the line VI—VI of FIG. 4.

FIGS. 4, 5 and 6 illustrate a positive displacement fluid motor, of the vane-type, which may be used as a motor 501 for driving the propellers 1223 or 1224. Referring to FIGS. 4, 5 and 6, the positive displacement fluid motor includes a rotor 1002 provided with axially elongated radially outwardly opening slots receiving, for radial reciprocation therein, vanes generally indicated at 1009. Each vane 1009 has a groove 1009B extending axially along its inner edge and slidably receiving, for radial reciprocation in the groove, a vane guide member 1009C which is biased radially inwardly by springs 1051. A vane guide element 1009D, which is essentially of cylindrical cross section, is seated in a circular cross section groove in the inner edge of each guide member 1009C, and these vane guide elements may oscillate about their axes. The vane guide elements 1009D may be of completely cylindrical configuration or may be partly cylindrical and partly plane or of another sectional curvature.

The radially outer edge of each of at least some of the vanes 1009 is formed with a pair of circular cross section grooves extending axially therealong, and the two grooves of each vane receiving sliding vane guide members 1011X and 1011Y, respectively. These sliding guide members 1011X and 1011Y, as best seen in enlargement 5BB, have the cross section of a truncated circle so that the portions thereof bearing in the associated groove have a circular configuration while the portions thereof facing radially outwardly have a planar configuration. The vane guide elements 1009D engage guide surfaces 1047A and 1047B of axially spaced guide members 1046A and 1046B. On the other hand, the radially outermost guide elements 1011X and 1011Y bear against a guide surface 1012 which is the radially inner surface of an inwardly projecting circumferentially extending rib on a casing portion 1008. The cooperation between the guide elements and their respective guide surface effects positive radially inwardly and radially outwardly displacement of the vanes 1009, with the springs 1051 serving to compensate any irregularities or fluctuations. It will be appreciated that the guide elements 1009D, 1011X and 1011Y, or any thereof, may either roll or slide along the associated guide surfaces.

As best seen in enlargement 5BB, the guide elements 1011X and 1011Y have radially outer guide surfaces 1090 which, in the particular illustration, are planar. These guide elements extend beyond a radially outer edge surface 1009K of each vane 1009Z, this surface being spaced radially inwardly from the surface 1012 to leave a clearance 1011G. It will be noted that the axes of the guide elements 1011X and 1011Y are displaced at equal angles $\alpha$ with respect to the central plane of the associated vane 1009Z.

The guide elements 1011X and 1011Y may be initially placed in the grooves on the radially outer edge of the associated vane 1009Z and, after the vane is inserted into its respective radial slot in rotor 1002, these guide elements are retained in position by the lateral guiding walls or the vanes.

The spaces 1011G may be made to communicate with the inter-vane spaces 1025A through 1025F and thus be under the pressure of the adjacent inter-vane spaces. These inter-vane spaces receive operating fluid through inlet ports 1053 and return operating fluid to the fluid pressure generator through outlet ports 1054. During rotation of rotor 1002, there may occur, with the configuration of guide surface 1012 as shown in FIG. 5, times when only one or the other of the guide elements 1011X or 1011Y bears against surface 1012. This, in turn, will determine the pressure in the spaces 1011G. The provision of the guide elements prevents abrasive contacts between the vanes 1009 and the associated positive guiding surfaces 1047A, 1047B and 1012. It also provides for the guiding surfaces to have any desired configuration of a generally curved nature and other than circular. At the same time, effective sealing is provided at all times between the inter-vane spaces.

It is also possible for each of some of the vanes 1009 to be provided, for positive radially inward movement, with other guide means. For this purpose, the vanes may be provided with pivots 1010 extending axially therealong and pivotally mounting slide elements 1011 engaged with guide surface 1012. Alternatively, both forms of vanes shown in FIG. 5 may be used in the same motor, the vanes may be all of one type, or the vanes may be all of the other type.

Each slide element 1011 is curved in a circumferential direction and includes a central part 1011R and circumferential extensions 1011S and 1011T. These circumferential extensions stabilize the travel of the respective slide element 1011 along the inner face 1012 of the casing element and prevent tilting of the elements 1011. Preferably, the extensions 1011S and 1011T are relatively narrow and may enter into respective narrow recesses 1011U on the surface of rotor 1012, as illustrated in FIG. 5. Thus, considered in an axial direction, the extensions 1011S and 1011T may be narrower than the associated slide elements 1011 or the central parts 1011R thereof.

FIGS. 4 and 5 illustrate passage or control means for the passage or control of the flow of fluid into the intervane spaces of the motor. These passage means, as best seen in FIG. 5, include a passage 1081A in casing part 1008E and a passage 1081B in casing part 1001F, the two passages being in axial alignment and communicating, at their inner ends, with a larger passage 1081X which is coaxial therewith. The outer ends of passages 1081A and 1081B communicate with outlet port 1054 or inlet port 1053, respectively. A piston 1081Y is slidably displaceable in enlarged passage 1081X, and this piston is a control piston which may reciprocate in passage 1081X. This passage also has a port or passage 1081C leading therefrom and communicating with respective inter-vane spaces 1027. Communication may be effected through the rotor, through the rotor side walls, through the intercasing spaces 1056, or, as shown in FIG. 4, through passage 1081 in casing part 1008 which communicates with intercasing space 1056 and then through axial bore 1055 with the spaces 1004A and 1005A. From there communication is had with the respective slots 1057 and the slot extensions 1058 and 1059 communicating with the innermost portions 1027 of the slots.

If a higher pressure is effective in outlet port 1054 than is effective in inlet port 1053, fluid flows through passage 1081A into 1081X and forces control piston 1081Y to the right blocking communication with port 1053 and thus preventing fluid flow into port 1053 from port 1054. On the other hand, the fluid at the pressure existing in port 1054 is supplied to the radially inner spaces 1027 of the slots 1057.

If the pressure in entrance or inlet port 1053 is greater than that in exit or outlet port 1054, control piston 1081Y moves to its extreme left position blocking flow of fluid from port 1053 into port 1054 while permitting the high pressure in port 1053 to be supplied to the inner spaces 1027 of slots 1057. Thus, under either condition, fluid pressure is effective on the radially inner ends of the vanes 1009 to assist in radially outward displacement of these vanes.

FIGS. 4 and 5 show a particular location of control piston 1081Y, but it should be understood that the control piston need not necessarily be located in this particular position. The only criterion is that the higher port pressure be applied to the inner ends of the vanes.

With the exception of the parts described, the positive displacement motor shown in FIGS. 4, 5 and 6 includes conventional sealing and bearing elements, including conventional output shafts and the like, and operates in a manner well known to those skilled in the art of fluid operated vane-type motors. The section shown in FIG. 6 is taken toward the left of FIG. 4 and illustrates certain features of the invention. It will, for example, be noted that the casing parts 1001E and 1001F are secured together at a dividing plane 1001G by suitable bolt means 1048. Also, while the casing is shown as an integral member in FIG. 4, it will be appreciated that it could comprise several sections separated along radial or diametric planes or both.

The operation of the fluid-stream-borne vehicle will now be described, it being understood that there are two completely independent fluid flow circuits interconnecting the fluid flow producing means 1261 and the motors 501, one fluid flow circuit being respective to each motor. Also, the two fluid flows are constantly maintained either equal or fixedly proportional. One fluid flow circuit comprises the interconnected supply conduits 1154M and 1281B leading from means 1261 to motor 501, and the interconnected return conduits 1281A and 1153M leading from the lefthand motor 501 to the means 1261. The other fluid flow circuit, which is completely independent of that just described, in that there is no intercommunication therewith, comprises the interconnected supply conduits 1154N and 1281D leading from means 1261 to righthand motor 501, and the interconnected return conduits 1281C and 1153N leading from righthand motor 501 to fluid flow producing means 1261. Also, while single acting positive displacement motors each having one inlet and one outlet could be used, in the actual arrangement shown in the drawings, and particularly in FIG. 5, each motor 501 has two fluid inlets 1053 and two fluid outlets 1054, and is thus a double acting motor. The two fluid inlets are supplied from a common line such as, for example, line 1281B or 1281D, and the two exhaust ports or return ports are connected to a common return line such as the return line 1281A or the return line 1281C.

Referring now to FIGS. 2 and 3, which illustrate the fluid flow producing means 1261, a combustible mixture is drawn in through the inlet port 1179 into the intervane space 1125A and the intervane space 1125B, is compressed in the intervane space 1125C, is ignited in the intervane space 1125D, expands in the intervane space 1125E, and is exhausted from the intervane spaces 1125F and 1125G to flow out through the exhaust port 1180. This effects rotation of the rotor 1102. As the rotor rotates, the vane assemblies 1109 are radially reciprocated and this causes alternating expansion and contraction of the chambers 1127. This alternating expansion and contraction of the chambers 1127 causes motive fluid alternately to be drawn into a chamber 1127 and then to be expelled therefrom under pressure.

Starting with the lower lefthand quadrant of FIG. 3, as vane assembly 1109 moves radially outwardly, its associated chamber 1127A is expanded. This causes motive fluid, or hydraulic fluid, to flow from conduit 1281A (FIG. 1) into conduit 1153M (FIG. 1) and thence into inlet port 1153M, port 1153A, axial passage 1181A, space 1189A, and bore 1102A into chamber 1127A. As the vane assembly having the chamber 1127A passes into the upper lefthand quadrant, due to clockwise rotation of rotor 1102, the chamber 1127A is decreased in volume due to the radially inward movement of the vane and hydraulic fluid is forced through bore 1102A into pintle space 1189B and thence into axial passage 1181B from which it flows into port 1154B and thence through conduits 1154M and 1281B to the inlet ports 1053 (FIG. 5) of lefthand motor 105. This fluid under pressure acting against the vanes 1009 effects clockwise rotation of the rotor 1002 of the lefthand motor 105 and the fluid leaving the intervane spaces of the motor is exhausted into outlet ports 1054 conjointly connected to return flow conduit 1281A.

For the righthand motor 501 an identical, but completely independent, flow circuit is provided as follows. Fluid in conduit 1281C enters conduit 1153N and flow into inlet port 1153C and thence through axial passage 1181C and into pintle recess 1189C being drawn into the then expanding chambers 1127D and 1127E of the radially outwardly moving vanes 1109. Upon further rotation of rotor 1102 (FIG. 3), the space 1127E decreases in volume and fluid is forced out therefrom through bore 1102E into pintle recess 1189D and thence through axial passage 1181D to outlet port 1154D and thence through conduit 1154N into conduit 1281D. From conduit 1281D, the fluid enters the inlet ports 1053 of the righthand motor 105 and is exhausted from the outlet ports 1054 thereof to return conduit 1281C.

As previously stated, the output of the flow producing means 1261 is adjusted, in equal amounts for both fluid flow circuit, by angular displacement of the control pintle 1189. For example, if control pintle 1189 were moved clockwise through about 45° from the maximum delivery passage shown in FIG. 3, so that the chambers 1127C and 1127D communicate with the pintle space 1189B, the output of the means 1261 would be reduced substantially to zero as, while one chamber 1127C is decreasing in volume due to radially inward movement of its associated vane 1109, the other chamber 1127D is increasing in volume due to radially outward movement of its associated vane 1109. At any position in between the position shown in FIG. 3 and the position just mentioned, the output is adjusted to a value between the maximum and minimum delivery volumes.

It is important to note that the vehicle shown in the drawings and described in the specification is a fluid-stream-borne vehicle as distinguished from a fluid-stream-driven vehicle, by virtue of the fact that the propellers or rotors 1223 and 1224 are rotatable about vertical axes and thus serve to support the vehicle in the air or the like or even in water, in the event of a water-borne vehicle.

While a specific embodiment of the invention has been shown and described in detail to illustrate the application of the principles of the invention, it will be understood that the invention may be embodied otherwise without departing from such principles.

What is claimed is:

1. A propeller-driven, fluid-stream-borne vehicle comprising, in combination, a body; at least two propellers rotatable about respective substantially vertical axes at respective locations spaced symmetrically on said vehicle; respective hydraulic fluid operated, positive displacement motors each directly driving one of said propellers; hydraulic fluid flow producing means on said vehicle having plural separated working chambers each producing a respective fluid output and the number of fluid outputs being equal to the number of said motors, said hydraulic fluid flow producing means delivering constantly proportional fluid flows out of all of said outputs; and respective fluid circuits, separate and independent from each other, each connecting a respective motor to a respective chamber for supply of fluid under pressure to the respective motor and return of fluid from the respective motor to said flow producing means independently of and separate from each other flow circuit; whereby said motors are driven at constantly and continuously proportional speeds; said hydraulic fluid flow producing means being a rotary vane combustion engine having plural pumping chambers each communicating with only a respective one of said fluid circuits; said engine including a rotor comprised in said pumping chamber means and a shaft rotated by said rotor; a further propeller operatively connected to said shaft; and control means operable to vary the division of the engine power between said pumping chambers and said shaft between a condition in which all of the engine power is delivered to said pumping chambers and a condition in which all of the engine power is delivered to said shaft.

2. A propeller-driven, fluid-stream-borne vehicle comprising, in combination, a body; at least two propellers rotatable about respective substantially vertical axes at respective locations spaced symmetrically on said vehicle; respective hydraulic fluid operated, positive displacement motors each directly driving one of said propellers; hydraulic fluid flow producing means on said vehicle having plural separated working chambers each producing a respective fluid output and the number of fluid outputs being equal to the number of said motors, said hydraulic fluid flow producing means delivering constantly proportional fluid flows out of all of said outputs; and respective fluid circuits, separate and independent from each other, each connecting a respective motor to a respective chamber for supply of fluid under pressure to the respective motor and return of fluid from the respective motor to said flow producing means, independently of and separate from each other flow circuit; whereby said motors are driven at constantly and continuously proportional speeds; said two propellers being spaced symmetrically laterally of the longitudinal center line of the vehicle considered in the direction of movement; whereby the constantly proportional speeds of said motors maintains, through the respective propellers, a stable attitude of said vehicle.

3. A propeller-driven, fluid-stream-borne vehicle, as claimed in claim 1, in which said two propellers are located symmetrically laterally with respect to the longitudinal center line of said vehicle considered in the direction of movement thereof, the propellers being rotatable about substantially vertical axes and serving for vertical movement of said vehicle; said further propeller being rotatable about a substantially horizontal and longitudinally extending axis and serving for movement of said vehicle in a substantially horizontal plane.

4. A propeller-driven, fluid-stream-borne vehicle comprising, in combination, a body; at least two propellers rotatable about respective substantially vertical axes at respective locations spaced symmetrically on said vehicle; respective hydraulic fluid operated, positive displacement motors each directly driving one of said propellers; hydraulic fluid flow producing means on said vehicle having plural separated working chambers each producing a respective fluid output and the number of fluid outputs being equal to the number of said motors, said hydraulic fluid flow producing means delivering constantly proportional fluid flows out of all of said outputs; and respective fluid circuits, separate and independent from each other, each connecting a respective motor to a respective chamber for supply of fluid under pressure to the respective motor and return of fluid from the respective motor to said flow producing means independently of and separate from each other flow circuit; whereby said motors are driven at constantly and continuously proportional speeds; said hydraulic fluid flow producing means including an angularly adjustable control pintle formed with circumferentially spaced ports each included in a respective one of said fluid-flow circuits and each associated with a respective one of said fluid outputs, said control pintle being angularly adjustable to vary all of said fluid outputs conjointly between zero delivery and maximum delivery while maintaining all of said fluid output constantly proportional; said control pintle being further angularly adjustable to conjointly reverse the flow of fluid through all of said fluid flow circuits to reverse the direction of rotation of said hydraulic fluid operated motor-driven propellers.

5. A propeller-driven, fluid-stream-borne vehicle, as claimed in claim 1, in which said control means comprises a control element selectively operable to conjointly vary the output of said pumping chamber means between zero and a maximum.

References Cited

UNITED STATES PATENTS

| | | | |
|---|---|---|---|
| 2,499,349 | 3/1950 | Ayres | 244—77 |
| 2,514,822 | 7/1950 | Wolfe | 244—17.23 X |
| 2,791,284 | 5/1957 | Jackson | 180—6.48 |
| 2,940,691 | 6/1960 | David | 244—12 |
| 3,085,403 | 4/1963 | Hamblin et al. | 180—6.48 X |
| 3,217,821 | 11/1965 | Dumas et al. | 180—6.48 |
| 984,269 | 2/1911 | Friedel | 244—53 X |
| 1,827,438 | 10/1931 | Rauch | 244—53 |
| 1,939,156 | 12/1933 | Wright | 244—18 |
| 2,212,490 | 9/1940 | Adler | 244—53 |
| 2,256,264 | 9/1941 | MacKay | 123—14 |
| 2,486,049 | 10/1949 | Miller | 115—35 |
| 2,713,828 | 7/1955 | Huber | 103—123 |
| 3,234,856 | 2/1966 | Martin | 91—413 |

FOREIGN PATENTS

| | | |
|---|---|---|
| 325,200 | 3/1935 | Italy. |
| 58,961 | 5/1913 | Austria. |

MILTON BUCHLER, Primary Examiner

T. W. BUCKMAN, Assistant Examiner

U.S. Cl. X.R.

103—130; 244—17.23